US008934035B2

(12) United States Patent
Jerdev et al.

(10) Patent No.: US 8,934,035 B2
(45) Date of Patent: *Jan. 13, 2015

(54) CORRECTION OF NON-UNIFORM SENSITIVITY IN AN IMAGE ARRAY

(75) Inventors: Dmitri Jerdev, South Pasadena, CA (US); Igor Subbotin, South Pasadena, CA (US); Ilia Ovsiannikov, Studio City, CA (US)

(73) Assignee: Micron Technology, Inc., Boise, IA (US)

(*) Notice: Subject to any disclaimer, the term of this patent is extended or adjusted under 35 U.S.C. 154(b) by 653 days.

This patent is subject to a terminal disclaimer.

(21) Appl. No.: 13/237,105

(22) Filed: Sep. 20, 2011

(65) Prior Publication Data

US 2012/0008018 A1    Jan. 12, 2012

Related U.S. Application Data (63) Continuation of application No. 12/573,615, filed on Oct. 5, 2009, now Pat. No. 8,045,040, which is a continuation of application No. 10/915,454, filed on Aug. 11, 2004, now Pat. No. 7,609,302.

(51) Int. Cl.
  *H04N 5/335* (2011.01)
  *H04N 5/357* (2011.01)

(52) U.S. Cl.
  CPC .................... *H04N 5/3572* (2013.01)
  USPC ......... 348/294; 348/229.1; 348/362; 348/335

(58) Field of Classification Search
  USPC .......... 348/241, 360, 361, 223.1, 208.1, 294, 348/251, 297, 335–340, 229.1, 362
  See application file for complete search history.

(56) References Cited

U.S. PATENT DOCUMENTS

| | | | |
|---|---|---|---|
| 5,949,483 A | 9/1999 | Fossum et al. | |
| 6,025,586 A | 2/2000 | Sakaue et al. | |
| 6,043,843 A | 3/2000 | Kelley et al. | |
| 6,483,535 B1 | 11/2002 | Tamburrino et al. | |
| 6,650,795 B1 | 11/2003 | Motta | |
| 6,731,338 B1 | 5/2004 | Lin | |
| 6,734,905 B2 | 5/2004 | Fossum et al. | |
| 6,952,291 B2 | 10/2005 | Suzuki et al. | |
| 7,148,920 B2 | 12/2006 | Aotsuka | |
| 7,233,359 B2 | 6/2007 | Suda | |
| 7,289,251 B2 | 10/2007 | Kwon | |
| 7,456,876 B2 | 11/2008 | Funakoshi et al. | |
| 7,609,302 B2 | 10/2009 | Jerdev et al. | |
| 2001/0013571 A1 | 8/2001 | Kakumoto et al. | |
| 2002/0025164 A1 | 2/2002 | Suzuki | |
| 2002/0079491 A1 | 6/2002 | Raynor | |
| 2002/0114077 A1 | 8/2002 | Javidi | |

(Continued)

*Primary Examiner* — Tuan Ho
(74) *Attorney, Agent, or Firm* — Dickstein Shapiro LLP (57) ABSTRACT

An improved non-uniform sensitivity correction algorithm for use in an imager device (e.g., a CMOS APS). The algorithm provides zones having flexible boundaries which can be reconfigured depending upon the type of lens being used in a given application. Each pixel within each zone is multiplied by a correction factor dependent upon the particular zone while the pixel is being read out from the array. The amount of sensitivity adjustment required for a given pixel depends on the type of lens being used, and the same correction unit can be used with multiple lenses where the zone boundaries and the correction factors are adjusted for each lens. In addition, the algorithm makes adjustments to the zone boundaries based upon a misalignment between the centers of the lens being used and the APS array.

44 Claims, 6 Drawing Sheets

(56) References Cited

U.S. PATENT DOCUMENTS

| | | |
|---|---|---|
| 2002/0190229 A1 | 12/2002 | Nakamura et al. |
| 2003/0011693 A1 | 1/2003 | Oda |
| 2003/0016444 A1 | 1/2003 | Brown et al. |
| 2003/0169354 A1 | 9/2003 | Aotsuka |
| 2003/0222995 A1 | 12/2003 | Kaplinsky et al. |
| 2004/0119854 A1 | 6/2004 | Funakoshi et al. |
| 2004/0174445 A1 | 9/2004 | Kawakami et al. |
| 2004/0264760 A1 | 12/2004 | Ishikawa |

CORRECTION OF NON-UNIFORM SENSITIVITY IN AN IMAGE ARRAY

This application is a continuation of application Ser. No. 12/573,615, filed Oct. 5, 2009 now U.S. Pat. No. 8,045,040, which is a continuation of application Ser. No. 10/915,454, filed Aug. 11, 2004, now issued as U.S. Pat. No. 7,609,302, the disclosures of which are incorporated herein by reference in their entireties.

FIELD OF THE INVENTION

The present invention relates generally to complementary metal oxide semiconductor (CMOS) imagers, and more particularly to correction of non-uniform sensitivity in pixels of such imagers.

BACKGROUND OF THE INVENTION

A CMOS image sensor is an imaging device built with CMOS technology for capturing and processing light signals. Results produced by the CMOS image sensor can be displayed. A type of CMOS image sensors, called a CMOS Active Pixel Sensors (APS), has been shown to be particularly suited for handheld imaging applications.

The CMOS APS comprises an array of pixel processing elements, each of which processes a corresponding pixel of a received image. Each of the pixel processing elements includes a photo-detector element (e.g., a photodiode or a photogate) for detecting brightness information in the received image, and active transistors (e.g., an amplifier) for reading out and amplifying the light signals in the received image. The amplification of the light signals allows circuitry in the CMOS APS to function correctly with even a small amount of the received light signals.

The CMOS APS also has color processing capabilities. The array of pixel processing elements employs a color filter array (CFA) to separate red, green, and blue information from a received color image. Specifically, each of the pixel processing elements is covered with a red, a green, or a blue filter, according to a specific pattern, e.g., the "Bayer" CFA pattern. As a result of the filtering, each pixel of the color image captured by a CMOS APS with CFA only contains one of the three colors.

For example, while a given pixel may have data on how much red was received by that pixel, it does not have any data as to how much blue or green was received by that pixel. The "missing" values are recovered by a technique called interpolation whereby the values of each color for the surrounding pixels are averaged in order to estimate how much of that color was received by the given pixel.

Figure 1:
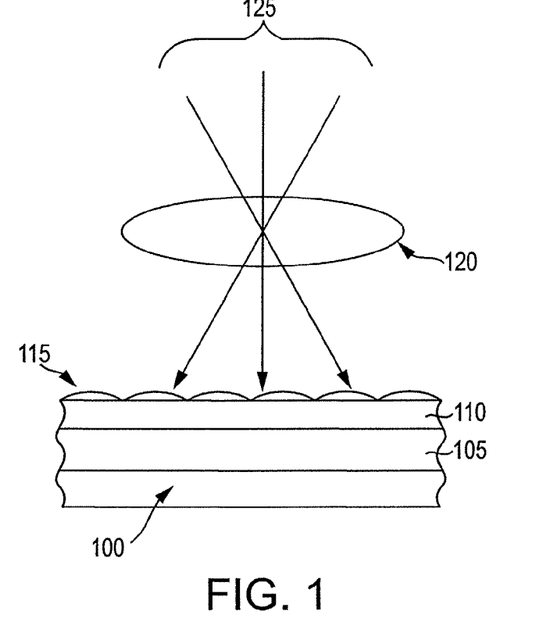
FIG. 1 depicts a schematic cross-sectional view of a conventional CMOS image sensor array.

While CMOS APSs have been well-received by industry and consumers alike, there are still some shortcomings. For example, as described above, each pixel contains a number of different parts required for capturing the image. The different parts are not ideal, of course, and can produce sensitivity variations over the array. With reference to FIG. 1, a CMOS APS contains a pixel array implemented in Si 100. The CMOS APS also contains a layer of protective Si oxide 105 which may also serve as a support for metal interconnects. The CMOS APS array further includes a color filter array 110 (e.g., a Bayer CFA) to allow only light of a specific wavelength to pass to each pixel within the active pixel area 100. The FIG. 1 CMOS APS also contains a layer of microlenses 115 that concentrates the incident light in the sensitive area of the underlying pixel and a main lens 120 that focuses the light rays 125 from the object onto the microlenses 115.

Most of the components described above, due to imperfections or practical limitations, may contribute to spatial signal attenuation, which in turn results in a sensitivity variation over the array. Further, it is known that for a given lens, the pixels of the APS have varying degrees of sensitivity depending upon their geographic location on the array. The rule of thumb is that the further away from the center of the APS the more correction the pixel requires. This phenomenon can adversely effect the images produced by the APS.

Often these variations can be measured and corrected as they mostly depend on the lens design used and generally do not vary from part to part. Such correction can be done in post-processing of already-acquired image data or during image acquisition (i.e., as the image is read out from the APS).

Since pixel sensitivity depends in part on the geometric location of a given pixel, generally speaking, one "global" correction function is not satisfactory. Prior knowledge of the non-uniform sensitivity of the pixels, when used with a particular type of lens, is used to generate a plurality of correction functions that are applied to (e.g., multiplied by) the pixel values as they are read out. In order to increase the special precision of the correction functions, the array is divided into a number of "zones," where each zone includes a predetermined number of pixels and where the pixels of each zone are multiplied by a correction factor depending upon the zone and the pixel location relative to the APS center.

For example, a 640×640 pixel array may include 4 zones in the x-direction and 4 zones in the y-direction where each zone contains 128 rows or columns of pixels. Another example is to divide the APS array into a number of zones where the zones are configured to optimize a particular lens that is used. The boundaries of the zones, however, cannot be modified to accommodate any other lenses that may be used.

One disadvantage of the prior art is that the zones of known correction algorithms are fixed by design. That is, while a given non-uniform sensitivity correction algorithm may work well for a given type of lens, the algorithm does not work as well with another type of lens. Another disadvantage associated with the prior art is that when the center of the lens is not perfectly aligned with the center of the APS array, as is often the case, there is currently no method to take that offset into account and to adjust the zone boundaries for it.

BRIEF SUMMARY OF THE INVENTION

The present invention addresses the shortcoming described above and provides an improved non-uniform sensitivity correction algorithm for use in an imager device (e.g., a CMOS APS). The algorithm provides for zones having flexible boundaries which can be reconfigured depending upon the type of lens being used in a given application. Each pixel within each zone is multiplied by a correction factor dependent upon the particular zone and pixel position while the pixel is being read out from the array. The amount of sensitivity adjustment required for a given pixel depends on the type of lens being used, and the same correction unit can be used with multiple lenses where the zone boundaries and the correction factors are adjusted for each lens. In addition, the algorithm makes adjustments to the zone boundaries based upon any misalignment between the centers of the lens being used and the APS array.

BRIEF DESCRIPTION OF THE DRAWINGS

The above and other features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 2:
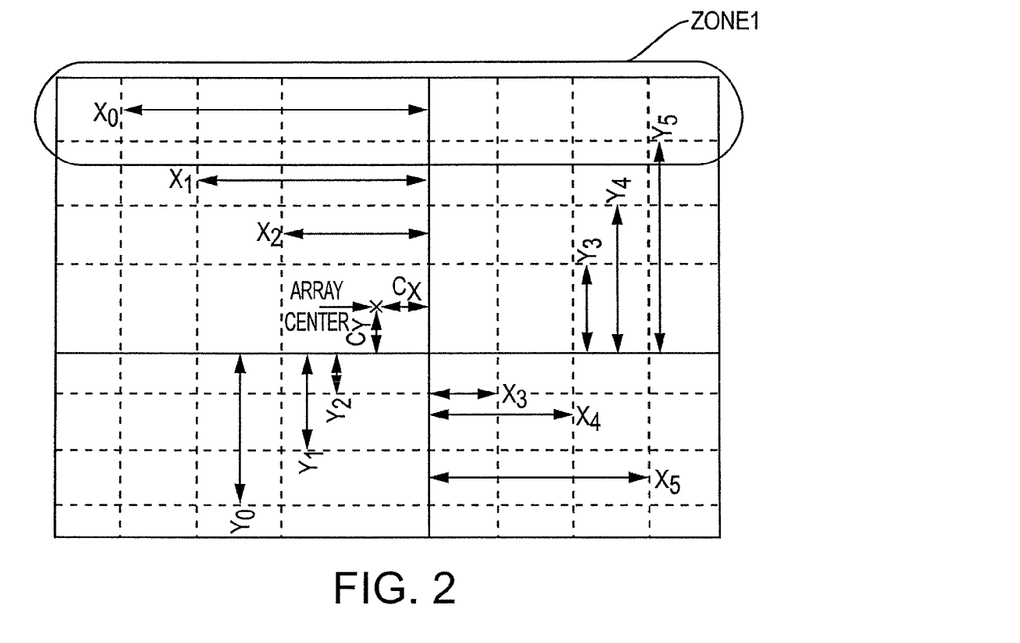
FIG. 2 depicts an APS array divided into zones, in accordance with an exemplary embodiment of the invention.

FIG. 2 depicts an APS array divided into several zones, in accordance with an exemplary embodiment of the invention. The zones depicted in FIG. 2 represent the optimum geographic location of the zones when the APS array is used in conjunction with a certain type of lens. The boundaries of the zones are programmable and may be modified to another configuration so that the APS array may be used with another type of lens. As depicted, the array is divided into eight different zones in the x-direction (defined by $X_0$ through $X_7$) and eight different zones in the y-direction (defined by $Y_0$ through $Y_7$). The coordinates of zone boundaries are referenced respectively to the center point of the lens (lens principle axis). The coordinates Cx and Cy are, in turn, specified with respect to the center of the APS array. As depicted in FIG. 2, the coordinates Cx and Cy represent the center of the lens correction functions in both the x-direction and the y-direction. When the centers of the lens and the APS array are aligned, the values of Cx and Cy are zero. However, when the center of the APS array is not aligned with the center of the lens, as is often the case, in accordance with this exemplary embodiment of the invention, that misalignment is identified, quantified and taken into account with respect to the zone boundaries.

The corrected pixel signal, P(x, y), is equal to the readout pixel value, $P_{IN}(x, y)$, multiplied by the correction function, F(x, y). The embodiment of the correction function is represented by the following expression:

$$F(x,y) = \theta(x,x^2) + \phi(y,y^2) + k*\theta(x,x^2)*\phi(y,y^2) + G \quad (1)$$

where $\theta(x, x^2)$ represents a piecewise parabolic correction function in the x-direction, where $\phi(y, y^2)$ represents a piecewise parabolic correction function in the y-direction, where $k*\theta(x, x^2)*\phi(y, y^2)$ is used to increase the lens correction values in the array corners, and where G represents a "global" gain (increase or decrease) applied to every pixel in the array, regardless of pixel location and zone.

Further, within each zone, the functions $\theta(x, x^2)$ and $\phi(y, y^2)$ are respectively represented by the generic expressions: $a_i x^2 + b_i x + c_i$, and $a_i y^2 + b_i y + c_i$ where i is the zone number.

In order to generate functions $\theta(x, x^2)$ and $\phi(y, y^2)$, as used in Eq. 1, initial conditions for each of these functions are specified. Functions $\theta$ and $\phi$ are generated for each color (red, green, or blue) separately to allow for color-specific correction. The initial conditions include a set of initial values of the correction functions and their "first derivatives." These initial conditions are stored in memory (e.g., registers). This is done once for the entire array and is not required to be done for each zone. Initial conditions are specified for each color where only two colors are required for each line in the case of a Bayer pattern.

The "first derivative" of the correction function for each pixel is the net increase or decrease in the correction function value as compared with its adjacent pixel. The first derivatives are stored in memory (e.g., a register) and generally changed with each step. For each next pixel of the same color adjacent to (e.g., to the right of) the second pixel, the net increase or decrease from the second pixel correction value (i.e., the first derivative of the third pixel) is stored in a register. In addition, the difference between the first derivative of the second pixel and the first derivative of the third pixel is stored in a register. The difference between the first derivative of the second pixel and the first derivative of the third pixel is called the "second derivative" of the correction function for that pixel and is also stored in a register. A set of color-specific second derivative values is stored for each zone. Functions $\theta$ and $\phi$ are then produced iteratively (using the value obtained on the previous step) using zone-specified values for the second derivatives.

For example, with reference to FIG. 2, assume the initial value of a top-left-most red pixel in zone 1 is 100 and the desired correction function value for the next red pixel to the right of the first red pixel is 104. Also assume that the correction function value of the third red pixel immediately to the right of the second red pixel is 110. These values are known in advance since the user already knows the type of lens being used with the array and already knows the optimum zone boundaries and correction function values to be applied to each pixel and for each color. The first derivative of the second red pixel is 4 since that is the net difference between the correction function value of the first and second red pixels. The first derivative of the third red pixel is 6 since that is the net difference between the correction function values of the second and third red pixels. In addition, the second derivative of the third pixel is 2 since that is the difference between the respective first derivatives of the second and third red pixels.

In accordance with an exemplary embodiment of the invention, the initial values of the two correction function and their first derivatives are stored in registers as well as second derivatives for each zone. The second derivative is a constant for a given zone (i.e., for all pixels in a given zone). The second derivatives are specified for all zones throughout the set of registers. As each pixel is read out from the array, the correction function value corresponding to that pixel is calculated and multiplied by the pixel value, resulting in the corrected pixel value, P(x, y). Storing the first and second derivatives of the pixels in each zone rather than each and every correction function value requires far less memory capacity.

Although the initial values are demonstrated as being assigned to the top left-most pixel, the initial value can be assigned to any pixel in the zone (e.g., the bottom right-most pixel, etc.) or to more than one pixel in the zone. In such a case, the pixels may be read out in two different directions. In accordance with an exemplary embodiment of the invention, the correction values may be introduced into the pixel signals as they are being read out in either normal mode, in mirroring mode (i.e., when the direction in which the pixels are read out is reversed), or in a dual-direction readout mode. The initial values are assigned for $\theta(x, x^2)$ at the beginning of each line while initial conditions for $\phi(y, y^2)$ are assigned only once at the first line of the frame.

Also, in accordance with an exemplary embodiment of the invention, the second derivative within a given zone does not change. Therefore, the difference between the first derivatives of pixels in a zone is the same within a given zone. Accordingly, zones are pre-selected so that the required correction function could be represented accurate enough by only one set of second derivatives for this zone. The pixels within the zone require approximately the same degree of sensitivity correction.

Further, in accordance with an exemplary embodiment of the invention, in order to assure a smooth transition from one zone to an adjacent zone, the functions $\theta(x, x^2)$ and $\phi(y, y^2)$, as well as their first derivatives, are equal at the point of transition from zone to zone. This produces a piecewise quadratic polynomial expression known as a quadratic spline.

It should be noted that under dark conditions, the effects of the correction algorithm should be minimized to avoid noise amplification. The pixel signal being read out has two components; a signal component proportional to the amount of light registered in the pixel and a noise component, which at very low light levels is represented in large extent by a pixel temporal noise. Thus, if one were to apply the correction function to the array in the dark condition, the temporal noise of the pixel array would also be changed. In practice, this would result in the noise component increasing towards the sides of the image array. To avoid this artifact, in accordance with an exemplary embodiment of the invention, the degree to which the correction algorithm is applied to the pixel signals depends upon the magnitude of the pixel illumination. This could be effectuated by adjusting the G value in Eq. 1 based on the exposure value for the current scene. That is, in dark conditions, when the degree of lens correction is lessened, the G parameter is increased. As a result, the share of the x, y components in the function F(x, y), and thus noise amplification, is significantly reduced.

Moreover, during preview mode, where the resolution is not as high as in normal mode, the correction algorithm is still employed. Rather than reading out every pixel in the array and multiplying each pixel by the corresponding correction value, fewer than every pixel (e.g., every other pixel) is read out and multiplied by its corresponding sensitivity correction value. In this manner, even during preview mode, the pixels of the array that are read out have relatively uniform sensitivity.

Figure 3:
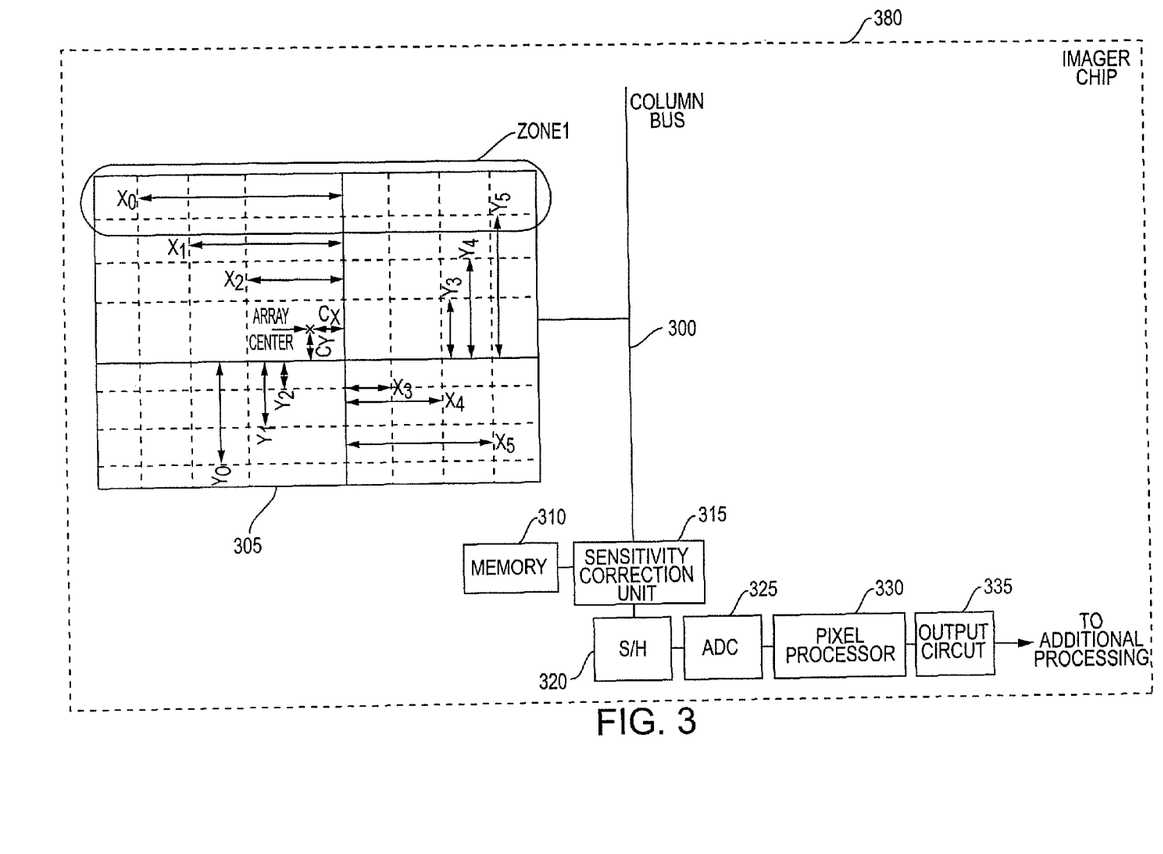
FIG. 3 depicts the FIG. 2 APS array coupled to readout circuitry and optionally on an imager integrated circuit chip.

With reference to FIG. 3, as the pixel values are read from the APS array 305, they are transferred to processing circuitry via column bus 300. In accordance with an exemplary embodiment of the invention, the pixel values are passed through a sensitivity correction unit 315 which multiplies the respective pixel values, as they are read out from the array 305, by a correction function value. This process compensates for the inherent differences in sensitivity for the pixels and generates a truer image. Memory 310 (e.g., a register, etc.) stores the initial values of the pixels in each zone and also stores the first and second derivatives of the respective pixels in the zones. As a result, the memory 310 need not store every correction function value of every pixel, but only the "roadmap" of how to get to those values. Thereafter, the corrected pixel signals are forwarded to sample/hold circuit 320, analog-to-digital converter 325, pixel processor 330 and output circuit 335, per the usual practice.

FIG. 3 also depicts the pixel sensor array 350 as being integrated onto or within an integrated circuit (IC) chip 380. The chip 380 may be made of any material suitable for use with pixel sensor arrays, including silicon-based materials, glass-based materials, etc.

Figure 4:
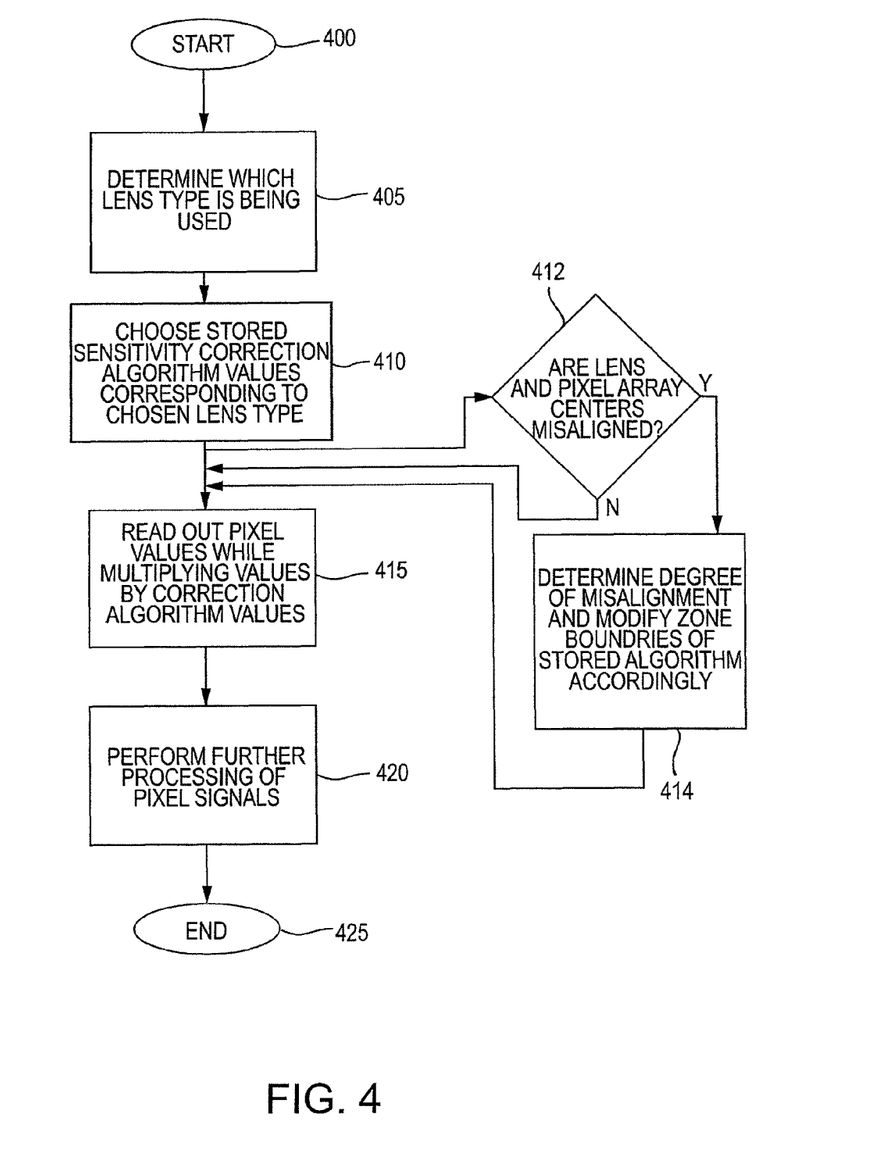
FIG. 4 depicts a flow chart describing an operation flow of the sensitivity correction algorithm, in accordance with an exemplary embodiment of the invention.

FIG. 4 depicts a flowchart illustrating an operational flow of the sensitivity correction algorithm, in accordance with an exemplary embodiment of the invention. The operation begins at segment 400 and at segment 405, a determination is made at the sensitivity correction unit as to which lens type, of the plurality of lens types capable of being used with the sensitivity correction unit, it being used in the application. At segment 410, the zone boundaries of the pixel array and sensitivity correction values for the pixels are selected depending on which lens type has been selected. At segment 412, a determination is made as to whether the respective centers of the pixel array 305 and a lens being used with the pixel array are misaligned. If yes, then the degree of misalignment is determined and an adjustment to the zone boundaries is made at segment 414. If they are not misaligned or when the adjustment has been made for the misalignment, then the process proceeds to segment 415.

At segment 415, the pixels of the pixel array 305 are read out while being multiplied by their respectively assigned correction values. Further processing of the pixel signals is performed at segment 420 and the process ends at segment 425.

Figure 5:
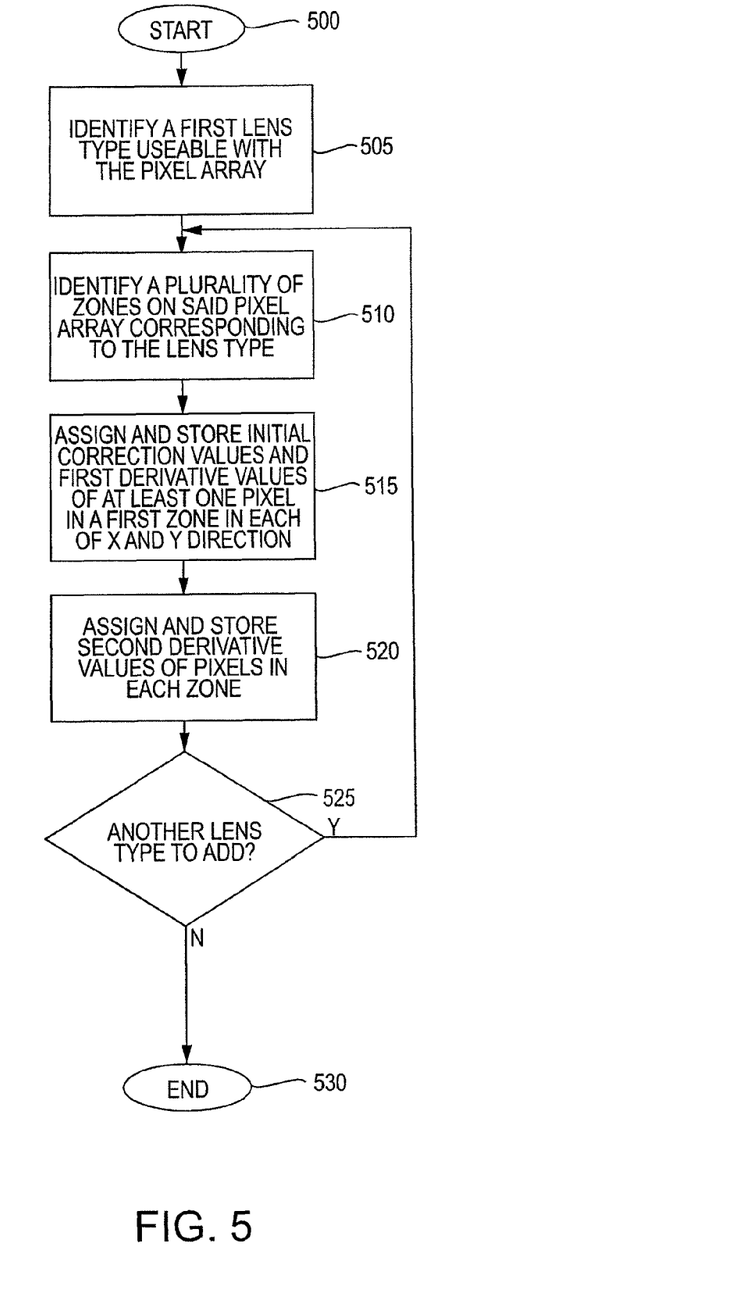
FIG. 5 depicts a flow chart describing an operational flow for generating a sensitivity correction algorithm, in accordance with an exemplary embodiment of the invention.

FIG. 5 depicts a flowchart demonstrating an operational flow of the generation of the sensitivity correction algorithm, in accordance with an exemplary embodiment of the invention. The process begins at segment 500 and at segment 505, a determination is made as to which lens types are being used for the application. At segment 510, for a selected lens type, a plurality of zones are identified into which the pixels of the pixel array 305 are divided. In accordance with an exemplary embodiment of the invention, the boundaries of the zones, as well as the number of zones, are programmable based on the type of lens being used.

At segment 515, initial sensitivity correction values and first derivatives of at least one pixel in a first zone in each of the x and y directions are stored in memory 310 (e.g., a register). At segment 520, second derivative values are generated and stored for each pixel in each zone of the pixel array 310. At segment 520, a determination is made as to whether there is another lens type to add to the algorithm. If yes, then the process returns to segment 510. If not, then the process ends at segment 530.

Figure 6:
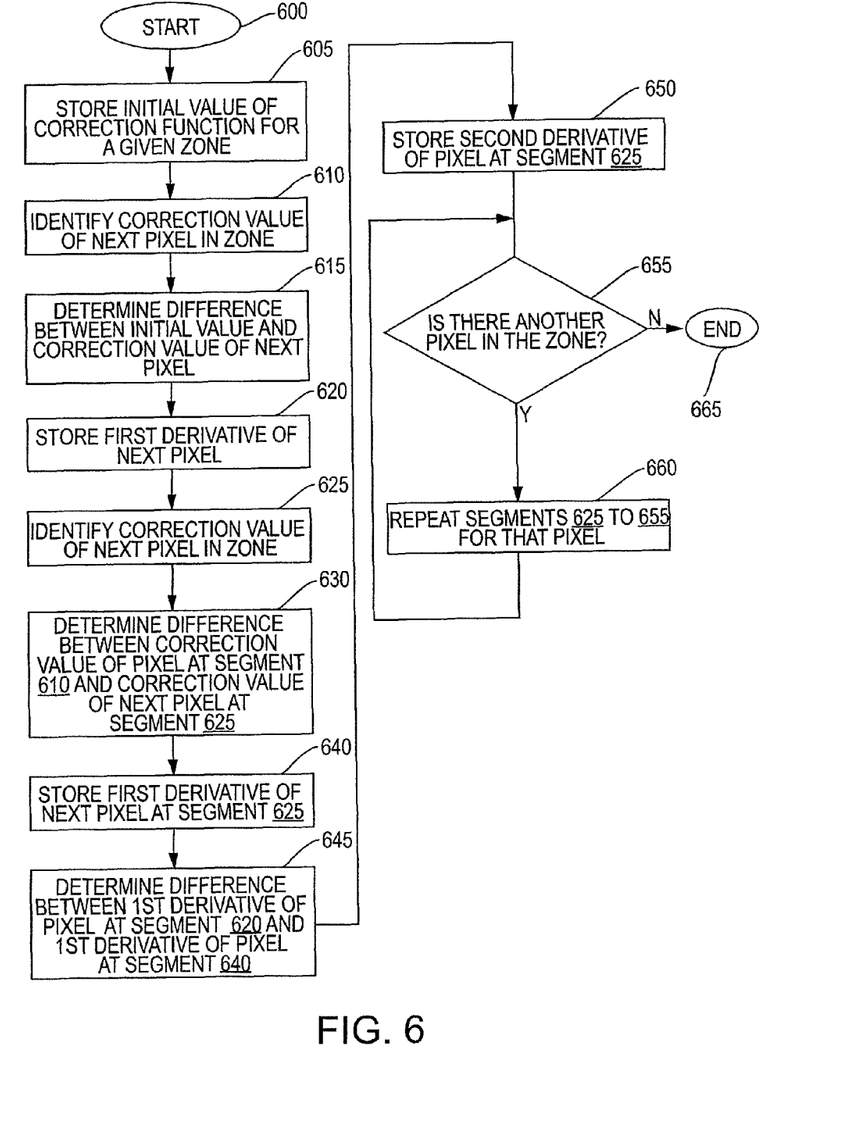
FIG. 6 depicts a flow chart describing a more detailed operational flow for generating a sensitivity correction algorithm, in accordance with an exemplary embodiment of the invention.

FIG. 6 depicts a flow chart describing a more detailed operational flow for generating a sensitivity correction algorithm, in accordance with an exemplary embodiment of the invention. The process begins at segment 600 and at segment 605, initial correction values are stored for each zone. At segment 610, the correction value of the next pixel in the zone is identified (this is predetermined based on the type of lens being used). At segment 615, the difference between the initial correction value and the correction value of the next pixel is determined. At segment 620, the first derivative of the next pixel is stored.

At segment 625, the correction value of the next pixel in the zone is identified. At segment 630, the difference between the correction value of the next pixel in the zone and the previous pixel in the zone is determined. At segment 640, the first derivative of the pixel at segment 625 is stored. At segment 645, the difference between the first derivatives stored at segments 620 and 640 is determined and at segment 650, the second derivative of the pixel at segment 625 is stored.

Still referring to FIG. 6, at segment 655, a determination is made as to whether there are any other pixels in the zone. If yes, then the process returns to segment 625 and repeats segments 625 through 655. If no other pixels in the zone, then the process ends at segment 665.

Figure 7:
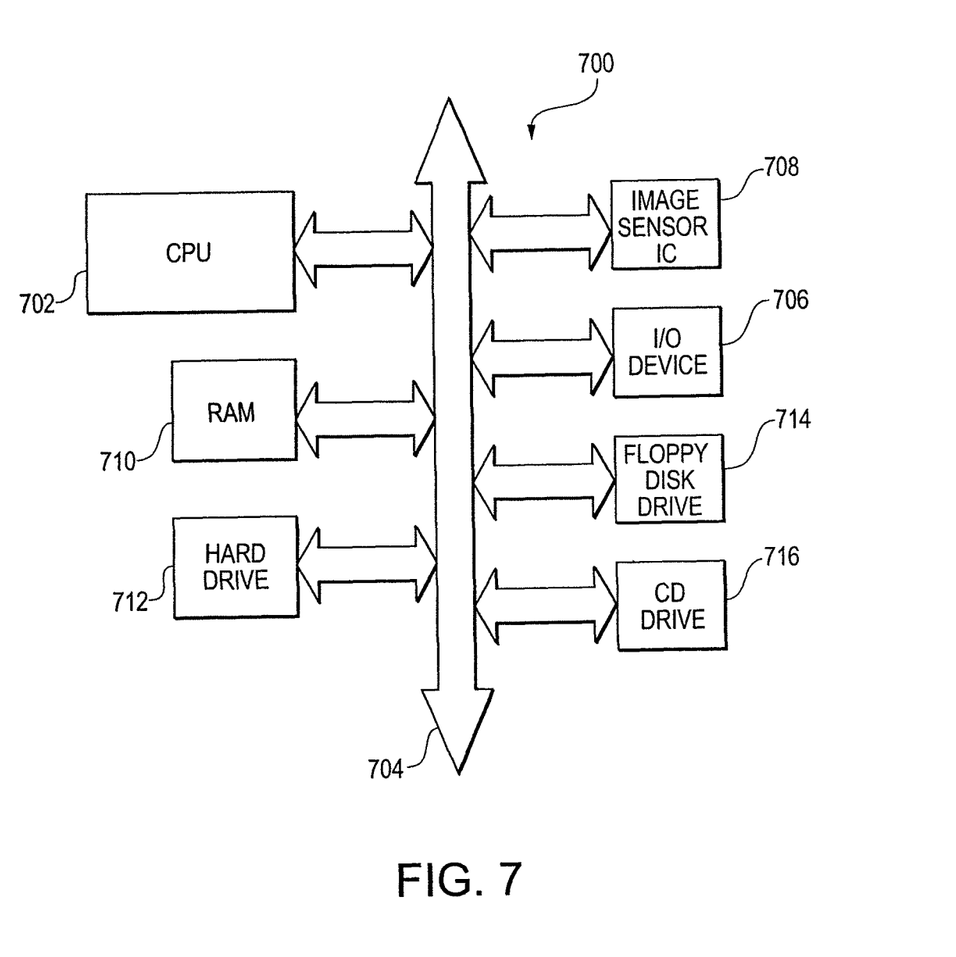
FIG. 7 depicts a processor based system containing the FIG. 3 APS array, in accordance with an exemplary embodiment of the invention.

FIG. 7 shows system 700, a typical processor based system modified to include an image sensor IC as in FIG. 3. Processor based systems exemplify systems of digital circuits that could include an image sensor. Examples of processor based systems include, without limitation, computer systems, camera systems, scanners, machine vision systems, vehicle navigation systems, video telephones, surveillance systems, auto focus systems, star tracker systems, motion detection systems, image stabilization systems, and data compression systems for high-definition television, any of which could utilize the invention.

System 700 includes central processing unit (CPU) 702 that communicates with various devices over bus 704. Some of the devices connected to bus 704 provide communication into and out of system 700, illustratively including input/output (I/O) device 706 and image sensor IC 408. Other devices connected to bus 704 provide memory, illustratively including random access memory (RAM) 710, hard drive 712, and one or more peripheral memory devices such as floppy disk drive 714 and compact disk (CD) drive 716.

Image sensor 708 can be implemented as an integrated image sensor circuit on a chip 380 with a non-uniform sensitivity correction unit 315, as illustrated in FIG. 3. Image sensor 708 may be combined with a processor, such as a CPU, digital signal processor, or microprocessor, in a single integrated circuit.

As described above, the disclosed algorithm provides zones having flexible boundaries which can be reconfigured depending upon the type of lens being used in a given application. The disclosed algorithm also provides for a simplified application method in which initial values of correction functions are stored and when pixel signals are read out from the array, the correction functions are easily applied to those signals while minimizing required storage. In addition, the algorithm makes adjustments to the zone boundaries based upon any misalignment between the center of the lens being used and the center of the APS array. Further, adjustments to the degree with which the correction algorithm is applied depending upon the quantity of light the pixel is exposed to is also disclosed. Exemplary embodiments of the present invention have been described in connection with the figures.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, while the invention is described in connection with a CMOS pixel imager, it can be practiced with any other type of pixel imager (e.g., CCD, etc.). In addition, although the invention is described in connection with eight programmable zones in each of the x-direction and the y-direction, the invention can be practiced with any number of programmable zones. Accordingly, the invention is not limited by the foregoing description or drawings, but is only limited by the scope of the appended claims.

What is claimed as new and desire to be protected by Letters Patent of the United States is:

1. An imager device, comprising:
   a pixel array comprising a plurality of pixels, wherein the pixel array captures images focused onto the pixel array by a main lens; and
   a sensitivity correction unit coupled to the pixel array, wherein the sensitivity correction unit selectively corrects the sensitivity of pixel signals from the plurality of pixels according to a correction function assigned to each pixel, and wherein the sensitivity correction unit determines whether the main lens and the pixel array are misaligned and reassigns the correction functions to the pixels to compensate for a misalignment.

2. The imager device of claim 1, wherein the sensitivity correction unit divides the pixels into an arrangement of zones, each zone including a plurality of pixels, and corrects the sensitivity of pixel signals from pixels within the zones, and wherein the sensitivity correction unit adjusts the arrangement of the zones to compensate for a misalignment.

3. The imager device of claim 1 further comprising:
   a sample and hold circuit coupled to the sensitivity correction unit for receiving corrected pixel signals;
   an analog-to-digital converter coupled to the sample and hold circuit for converting sampled corrected pixel signals to digital format; and
   a pixel processor for processing the digital corrected pixel signals.

4. The imager device of claim 1, further comprising a memory device storing at least one correction function assigned to one pixel.

5. The imager device of claim 4, wherein the memory device stores a plurality of derivatives of the correction functions assigned to the pixels.

6. The imager device of claim 1, wherein the sensitivity correction unit assigns a first set of correction functions to the pixels when a first main lens is used with the imager device, and wherein the sensitivity correction unit assigns a second and different set of correction functions to the pixels when a second main lens is used with the imager device.

7. The imager device of claim 1, wherein the sensitivity correction unit divides the pixels into a first arrangement of zones when a first main lens is used with the imager device, and wherein the sensitivity correction unit divides the pixels into a second and different arrangement of zones when a second main lens is used with the imager device.

8. The imager device of claim 1, wherein the sensitivity correction unit adjusts the correction function assigned to each pixel according to an amount of light received by the pixel array.

9. A method of correcting sensitivity of pixels of an imager device, the method comprising:
   determining whether a main lens is misaligned with a pixel array comprising a plurality of pixels;
   focusing light onto the pixel array through the main lens and producing a plurality of pixel signals from the plurality of pixels; and
   correcting the plurality of pixel signals by applying a correction function to each pixel signal according to a correction function scheme using a sensitivity correction unit;
   wherein the sensitivity correction unit adjusts the correction function scheme according to a detected misalignment between the pixel array and the main lens.

10. The method of claim 9, wherein the sensitivity correction function scheme comprises a plurality of zones, each zone comprising a plurality of pixels.

11. The method of claim 10, wherein the sensitivity correction unit changes which pixels are included in the zones to adjust the correction function scheme according to the detected misalignment between the pixel array and the main lens.

12. The method of claim 9, further comprising:
determining which main lens of a plurality of main lenses is being used with the pixel array;
applying a correction function to the pixel signals according to a first correction function scheme when a first main lens is being used with the pixel array; and
applying a correction function to the pixel signals according to a second correction function scheme when a second main lens is being used with the pixel array.

13. The method of claim 9 further comprising:
forwarding at least one corrected pixel signal for at least one of the pixels to a sample and hold circuit;
converting an output of the sample and hold circuit to digital format; and
conducting further pixel processing of a digital version of the at least one corrected pixel signal.

14. The method of claim 9, further comprising calculating the correction functions to be applied to the pixel signals using derivatives of the correction functions of the correction function scheme.

15. An imager device, comprising:
a pixel array comprising a plurality of pixels, wherein the pixel array captures images focused onto the pixel array by a main lens;
a sensitivity correction unit coupled to the pixel array, wherein the sensitivity correction unit selectively corrects the sensitivity of pixel signals from the plurality of pixels according to a plurality of correction functions; and
a memory storing a plurality of derivatives of the correction functions,
the plurality of derivatives comprising a first derivative of the correction functions for less than all of the plurality of pixels, wherein a first derivative of the correction functions is defined as the difference between two correction functions.

16. The imager device of claim 15, wherein the memory further stores a correction function for less than all of the plurality of pixels.

17. The imager device of claim 15, wherein the memory stores a plurality of second derivatives of the correction functions, wherein a second derivative of the correction functions is defined as the difference between two first derivatives of the correction functions, and wherein a first derivative of the correction functions is defined as the difference between two correction functions.

18. The imager device of claim 17, wherein the sensitivity correction unit divides the pixels into zones, and wherein the zones comprise pixels having a common second derivative of the correction functions.

19. The imager device of claim 18, wherein the memory stores a correction function and a first derivative of a correction function for only one pixel from each zone.

20. The imager device of claim 17, wherein the sensitivity correction unit calculates the correction functions for the plurality of pixels using the plurality of second derivatives.

21. The imager device of claim 17, wherein the first derivative of the correction functions is further defined as the difference between two correction functions for pixels of the same color, and wherein the second derivative of the correction functions is further defined as the difference between two first derivatives of the correction functions of pixels of the same color.

22. The imager device of claim 18, wherein the sensitivity correction unit divides the pixels into a first arrangement of zones when a first main lens is used with the imager device, and wherein the sensitivity correction unit divides the pixels into a second and different arrangement of zones when a second main lens is used with the imager device.

23. An imager device, comprising:
a pixel array comprising a plurality of pixels for capturing images with more than one type of main lens for focusing light on the plurality of pixels; and
a programmable sensitivity correction unit coupled to said pixel array for selectively correcting sensitivity of pixel signals from pixels in said pixel array by dividing said pixel array into an arrangement of zones, each zone having a plurality of pixels, and correcting the sensitivity of pixel signals from pixels in said pixel array according to their location within said zone,
wherein said division of said pixel array and said sensitivity correction is performed according to the type of main lens used with said pixel array.

24. The imager device of claim 23 further comprising:
a memory device coupled to said sensitivity correction unit for storing at least one correction value for correcting the sensitivity of pixel signals from of at least one corresponding pixel.

25. The imager device of claim 23 further comprising:
a column bus coupling at least one pixel of said pixel array and said sensitivity correction unit.

26. The imager device of claim 25 further comprising:
a sample and hold circuit coupled to said sensitivity correction unit for receiving corrected pixel signals;
an analog-to-digital converter coupled to said sample and hold circuit for converting sampled corrected pixel signals to digital format; and
a pixel processor for processing said digital corrected pixel signals.

27. The imager device of claim 23, wherein said sensitivity correction unit is configured to apply correction values to pixel signals for said pixels, each pixel in a given zone having a correction value determined according to at least one derivative calculation for each of said pixel signals.

28. The imager device of claim 23, wherein said arrangement of zones comprises a first number of zones when said pixel array is used with a first type of main lens, wherein each of said first number of zones respectively contains a predetermined plurality of pixels of said pixel array.

29. The imager device of claim 28, wherein:
said arrangement of zones comprises a second number of zones different from said first number of zones when said pixel array is used with a second type of main lens different from said first type of main lens, and
each of said second number of zones respectively contains a predetermined plurality of pixels of said pixel array different from said pixels associated with said first number of zones.

30. The imager device of claim 28, wherein said first number of zones comprises eight zones in the x-direction and eight zones in the y-direction.

31. The imager device of claim 23, wherein said sensitivity correction unit is configured to correct for any misalignment between respective centers of said pixel array and a main lens used with said pixel array.

32. The imager device of claim 23, wherein said imager device comprises a CMOS imager.

33. The imager device of claim 23, wherein said sensitivity correction unit is configured to adjust a degree of correcting depending upon an amount of light received by said pixel array.

34. A method of correcting sensitivity of pixels of an imager device, the method comprising:
   determining which of a plurality of types of main lenses for focusing light on a plurality of pixels, is being used with a pixel array comprising the plurality of pixels;
   programming a sensitivity correction unit used with said pixel array to correspond to a first type of main lens being used with said pixel array,
   wherein said first type of lens is one of a plurality of types of main lenses for capturing images with said pixel array and said sensitivity correction unit;
   selectively correcting sensitivity of pixel signals from pixels in said pixel array according to said determined type of main lens by dividing said pixel array into an arrangement of zones, each zone having a plurality of pixels, and correcting the sensitivity of pixel signals from pixels in said pixel array according to their location within said zone,
   wherein said division of said pixel array is performed according to a type of main lens used with said pixel array, and
   wherein said sensitivity correction is adjusted according to a type of main lens used with said pixel array.

35. The method of claim 34 further comprising:
   forwarding at least one corrected pixel signal for at least one of said pixels to a sample and hold circuit;
   converting an output of said sample and hold circuit to digital format; and conducting further pixel processing of a digital version of said at least one corrected pixel signal.

36. The method of claim 34, wherein said act of determining comprises:
   determining that a first type of main lens, of a plurality of lenses for capturing images with said pixel array, is being used with said pixel array.

37. The method of claim 36, wherein said act of selectively correcting sensitivity comprises:
   dividing said pixel array into a predetermined first number of zones based upon said first type of main lens being used, where the pixel signals from pixels of each zone have a sensitivity correction determined according to at least one derivative calculation for pixel signals for said pixels.

38. The method of claim 37 further comprising:
   determining that a second type of main lens different from said first type of main lens, of said plurality of main lenses for capturing images with said pixel array, is being used with said pixel array; and
   dividing said pixel array into a predetermined second number of zones different from said first plurality of zones based upon said second type of main lens being used, where the pixel signals from pixels of each zone have a sensitivity correction determined according to at least one derivative calculation of said pixel signals.

39. The method of claim 34, wherein said act of programming comprises:
   assigning respective correction function values to each pixel of said pixel array, wherein said respective correction function values correspond to said first type of main lens.

40. The method of claim 39, wherein said act of assigning comprises:
   storing an initial correction function value corresponding to at least a first pixel of said pixel array; and
   storing a first derivative of said initial correction function value corresponding to a correction function value of at least a second pixel of said pixel array.

41. The method of claim 40 further comprising:
   storing a first derivative of said correction function value of said at least a second pixel corresponding to a correction function value of at least a third pixel of said pixel array; and
   storing a second derivative of said correction function value of said at least a second pixel corresponding to said correction function value of said at least a third pixel of said pixel array.

42. The method of claim 34, wherein said act of correcting further comprises:
   multiplying a first pixel value being read out from a first pixel of said pixel array by a first correction function value corresponding to said first pixel.

43. The method of claim 34, wherein said act of correcting further comprises:
   adjusting a degree of correcting depending upon an amount of light received by said pixel array.

44. The method of claim 37, wherein said act of dividing further comprises:
   determining that respective centers of said first type of main lens and said pixel array are misaligned; and
   adjusting respective boundaries of said first plurality of zones based on the misalignment of the centers of the first type of main lens and the pixel array.

* * * * *

UNITED STATES PATENT AND TRADEMARK OFFICE
CERTIFICATE OF CORRECTION

PATENT NO. : 8,934,035 B2  
APPLICATION NO. : 13/237105  
DATED : January 13, 2015  
INVENTOR(S) : Dmitri Jerdev et al.

Page 1 of 1

It is certified that error appears in the above-identified patent and that said Letters Patent is hereby corrected as shown below:

Title Page, Item (73), in column 1, in "Assignee", line 1, delete "IA" and insert -- ID --, therefor.

In the Claims

In column 10, line 27, in Claim 24, after "from" delete "of".

Signed and Sealed this
Eighteenth Day of August, 2015

Michelle K. Lee
*Director of the United States Patent and Trademark Office*